United States Patent [19]

Goff et al.

[11] 4,300,220

[45] Nov. 10, 1981

[54] THREE COMPONENT DETECTOR AND HOUSING FOR SAME

[75] Inventors: Donald D. Goff; John T. O'Brien, both of Bartlesville, Okla.

[73] Assignee: Phillips Petroleum Co., Bartlesville, Okla.

[21] Appl. No.: 150,491

[22] Filed: May 16, 1980

[51] Int. Cl.³ .............................................. G01V 1/16
[52] U.S. Cl. .................................. 367/188; 181/401; 73/654; 29/594
[58] Field of Search ............... 367/165, 178, 182, 185, 367/188, 75; 181/104, 401; 73/649, 654; 29/594, 602 A; 174/50.54

[56] References Cited

U.S. PATENT DOCUMENTS

| | | | |
|---|---|---|---|
| 2,215,297 | 9/1940 | Owen | 367/75 |
| 2,982,942 | 5/1961 | White | 367/182 |
| 3,344,881 | 10/1967 | White | 181/104 |
| 3,475,722 | 10/1969 | White | 181/104 |
| 3,506,957 | 4/1970 | Davison | 367/178 |
| 3,626,364 | 12/1971 | Senion et al. | 367/178 |
| 3,736,556 | 5/1973 | Barr | 367/178 |
| 3,858,168 | 12/1974 | Barr et al. | 367/185 |
| 3,877,296 | 4/1975 | Rihn | 367/178 |
| 4,078,223 | 3/1978 | Strange | 367/178 |

OTHER PUBLICATIONS

Shimshoni et al., "Seismic Signal Enhancement with Three Component Detectors", 10/64, pp. 664-671, Geophysics, vol. 24, #5.

Primary Examiner—Nelson Moskowitz

[57] ABSTRACT

A detector utilizing three seismometers is provided which is operable to detect three components of particle motion waves.

42 Claims, 8 Drawing Figures

THREE COMPONENT DETECTOR AND HOUSING FOR SAME

BACKGROUND OF THE INVENTION

The present invention relates generally to an apparatus suitable for the detection of particle motion waves. In another aspect, the present invention pertains to an apparatus suitable for the detection of seismic waves, for example, those seismic waves studied by the geophysical industry in determining subsurface geophysical characteristics.

In the field of seismic exploration, it is necessary to detect components of ground motion along each of the coordinate axes in order to correlate detected vibrations to vibrations characteristic of pressure and shear waves. Traditionally, this is done by orienting seismometers so that a principal axis of sensitivity of each seismometer is aligned as closely as possible with a direction of suspected maximum particle displacement.

The vibrations and maximum particle displacements associated with pressure or P-Waves, are perpendicular to the wave front, or parallel to the direction of propagation of the pressure wave. The vibrations and maximum particle displacements associated with shear or S-Waves, are in a plane tangent to the shear wave front, i.e. transverse. Since a shear wave produces transverse particle motion, it can exhibit polarization effects, i.e. it may be composed of two prependicular components. In the conventional nomenclature shear waves with particle motion only in a horizontal plane are called SH-Waves, and shear waves with a component of particle motion in a vertical plane are called SV-Waves. SV-Waves will usually have a component of horizontal particle motion, but SV particle motion can be considered to be constrained to be in a vertical plane defined by the ray paths from source to reflector and from the reflector to the receiver. At an interface between two media with different acoustic impedances P-Waves and SV-Waves can be converted into each other by non-normal incidence to the interface. SH-Waves are not converted to SV-Waves or P-Waves at interfaces.

P, SV and SH waves, like other types of seismic waves, propagate in a direction generally away from a seismic event or shot point. The exact direction of propagation may change due to reflection refraction of the waves from formations with which the waves have come into contact during the course of propagation.

To detect P, SV and SH waves, the method utilized by the prior art was thus orienting a first geophone with its principle axis of sensitivity aimed generally vertically, so as to detect predominately P-Waves reflected from deep events and traveling nearly vertically at the surface; orienting a second geophone with its principal axis of sensitivity generally horizontally and in line with the source to receiver axis, so as to detect predominately SV-Waves; and orienting a third geophone with its principal axis of sensitivity generally horizontally and perpendicular to the plane defined by the axes of the first and second geophones, so as to detect predominately SH-Waves. Utilization of this method requires two geophones designed for horizontal operation and one geophone designed for vertical operation.

A geophone is basically a device which translates a mechanical vibration into an electrical signal which duplicates the character of the mechanical vibration. Geophones transform mechanical energy into electrical energy by utilization of a coil and magnet arrangement. A magnet is mounted in a fixed position on a frame which is in turn secured to the earth so as to vibrate therewith. A coil surrounds the magnet. The coil is movably mounted to the frame such as by springs. When vibrations of the earth produce movement in the frame and magnet, the coil, because of inertia, tends to remain in the same position. The relative movement between the coil and magnet along a longitudinal axis of the assembly induces an electrical signal in the coil which is proportional to the velocity of the coil relative to the magnet. The principal axis of sensitivity is along the direction the maximum displacement between the coil and magnet.

In most applications, the coil is mounted around the magnet so as to allow movement only along the longitudinal axis of the coil. The mounting is designed so as to be only minimally effected by gravitational forces. Gravitational forces acting on movement of the coil along its longitudinal axis will vary with the sine of the angle which the longitudinal axis makes with the horizontal. Because the gravitational forces which must be neutralized vary with the sine of the angle at which the geophone is to be operated, the design of the coil mounting must be different for geophones designed to operate at different angles in order to maintain gravitational distortion at a minimum. This is commonly done by mounting geophone coils to be used at different angles of operation on springs of different strengths.

Utilization of different strength springs has an effect on relative movement which occurs between the coil and the magnet when a mechanical vibration is received. This effect is manifested as a change in the velocity, magnitude and/or frequency of the movement between the coil and magnet, and thus results in a change in the nature of the electrical signal produced. Utilization in the same detector of geophones designed to operate at different angles, as in prior art, required careful matching and calibration of the geophones used, to insure that each geophone would produce an equivalent signal for equivalent mechanical vibrations received along the longitudinal axis of each coil. It is thus extremely desirable to avoid using geophones designed to operate at different angles and having springs of different strengths in the same detector.

As previously mentioned, the effect of gravity on relative movement between the geophone coil and magnet is proportional to the sine of the angle which the longitudinal axis of movement makes with the horizontal. Leveling of horizontally mounted geophones is especially critical, due to the fact that gravitational forces and geophone motions are at right angles. If a detector comprised of horizontally mounted geophones is improperly leveled in affixing it to the earth, or if it becomes partially dislodged when receiving mechanical vibrations, the horizontally mounted geophones may be disoriented sufficiently from the horizontal so that gravitational forces along the longitudinal axis of movement act to produce a distorted signal which is unrepresentative of the received mechanical vibration. It is thus desirable to utilize a detector which does not utilize horizontally oriented geophones.

The moment of inertia of a seismic detector about the point at which it is affixed to the earth and also about its central axis of desirably of small magnitude. When the detector has a low moment of inertia about the point at which it is affixed to the earth, it accelerates more readily about the point at which it is affixed when disturbed by a seismic wave, and decelerates more readily when the disturbance has ended, than a detector with a higher moment of inertia. It thus more closely follows the movements of the earth and gives more accurate results attributable at least in part to the elimination of spurious housing motion caused in part by harmonic vibrations. Additionally, because it develops less torque about the point at which it is affixed to the earth once set into motion, it is less likely to become dislodged or shift as seismic waves pass under it than a detector with a higher moment of inertia. It is thus desirable to keep the mass of the detector low, and the distribution of the mass close about the point at which it is to be affixed and about its central axis.

In-field usage of geophones is characterized by rough handling. It is thus desirable to protect the geophones to prevent damage which may be difficult to repair in the field. Protective devices, such as geophone housings, must be sturdy enough to protect the geophones contained within and yet light enough to accurately follow the movements of the earth so as to provide a representative signal of the vibrations received.

OBJECTS OF THE INVENTION

It is thus an object of this invention to provide a detector which can detect three components of ground motion.

It is also an object of this invention to provide a detector capable of detecting three components of ground motion which does not utilize geophones designed for horizontal orientation.

It is further an object of this invention to provide a rugged geophone housing especially adapted for field usage and possessing a low moment of inertia.

It is another object of this invention to provide a method of orienting three geophones with respect to the earth to detect both vertical and horizontal components of particle motion waves.

It is yet another object of this invention to provide a high impact plastic geophone housing which provides improved insulation from outside interference and virtually eliminates faulting to the ground and is inexpensive and simple to manufacture.

Other objects and advantages of the present invention will become apparent from the following detailed description taken in connection with the accompanying drawings wherein are set forth by way of illustration and example certain embodiments of this invention.

SUMMARY OF THE INVENTION

In accordance with one embodiment of the invention, geophone holder is adapted to hold three geophones with their principal axes of sensitivity at about an angle A from the horizontal. In accordance with another embodiment of the invention, a seismic detector comprises three geophones mounted to the above described holder. In accordance with further embodiments of the invention, methods of constructing the above described geophone holder and seismic detector are given. In accordance with yet another embodiment of the invention, three geophones are oriented at about an Angle A with respect to the horizon for detection of particle motion waves.

DETAILED DESCRIPTION OF THE INVENTION

Figure 1:
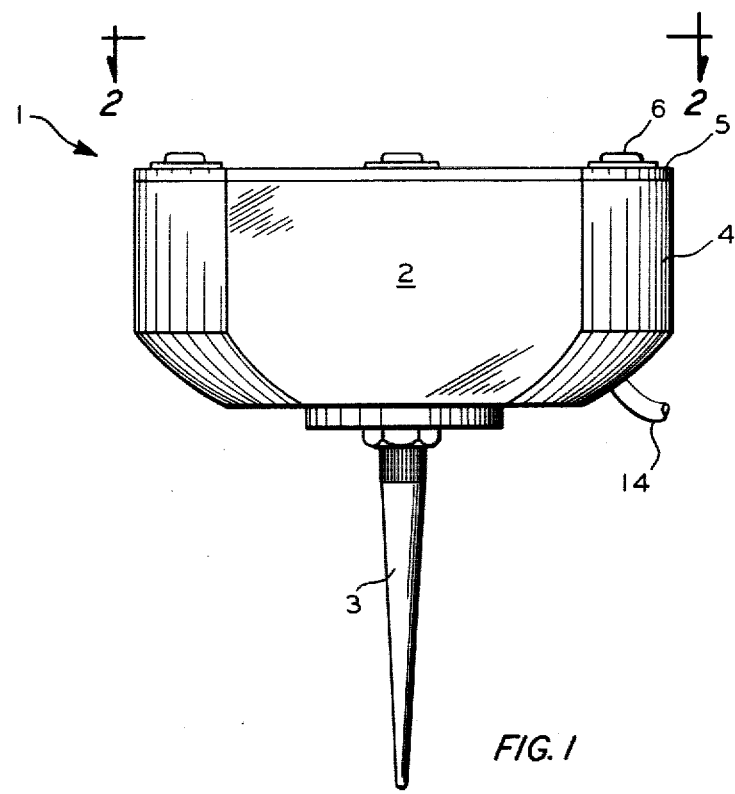
FIG. 1 is a side view of a seismic detector in accordance with one embodiment of the invention.

The reference numeral 1 designates generally one embodiment of a seismic detector of the present invention. The seismic detector 1 is comprised of a frame having a portion suitable for holding three geophones 11, such as illustrated housing 2, with a portion of the frame suitable for securing the housing 2 to the earth. As illustrated, the portion of the frame suitable for securing the housing to the earth is support member 3. Support member 3 is fastened to a lower portion of the housing 2 and is adapted to be pressed into the earth. The direction in which support member 3 extends away from housing 2 is generally normal to an imaginary plane (not illustrated) which passes through the housing 2. The housing 2 can be made of any suitable material, for example, aluminum. Preferably, the material from which housing 2 is constructed is durable, lightweight and non-conducting. A thermoplastic material such as for example, polyphenylene sulfide, is the preferred material. The support member 3 is preferably constructed of a rigid metal, such as steel.

Figure 2:
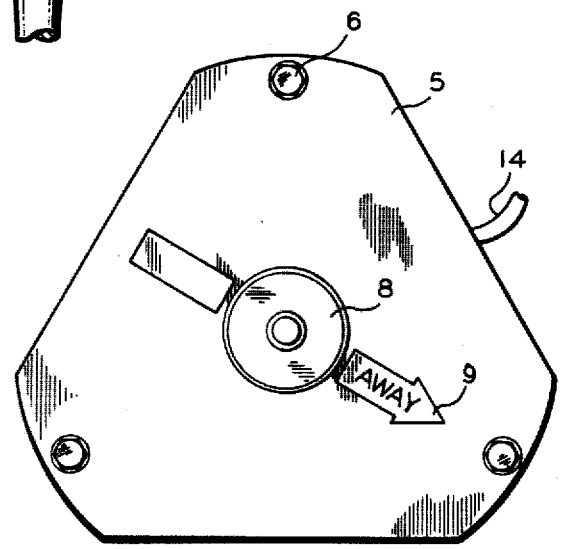
FIG. 2 is a plan view of the seismic detector shown in FIG. 1.
Figure 4:
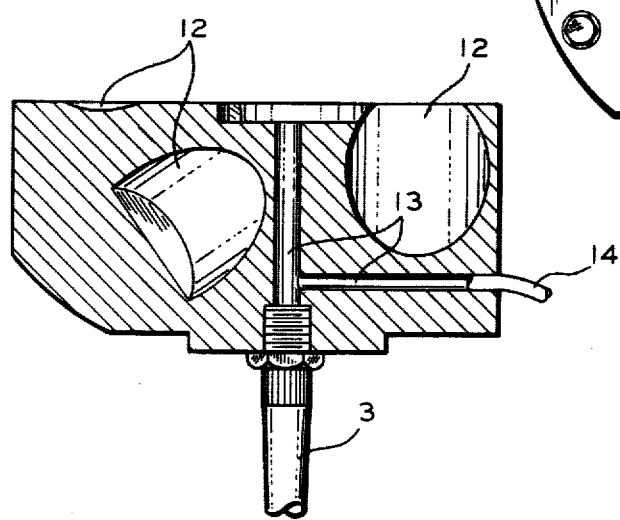
FIG. 4 is a side cross-sectional view of the seismic detector of FIG. 3 taken along the indicated lines.

The housing 2 is comprised of a container portion 4 and a cover portion 5. The cover portion 5 is adapted for closely fitting the container 4 and can be fastened thereto by various types of fastening means, such as screws 6. As illustrated in FIG. 2, the cover 5 can also be provided with means for orienting the seismic detector 1 with respect to the horizon, for example, bubble level 8, and also means for orienting the seismic detector 1 with respect to the shot point, such as arrow 9. The bubble level 8 can be secured to the cover 5 by suitable means for example, cement. The arrow 9 can be painted, etched, or cast as an integral part of the cover 5.

Figure 6:
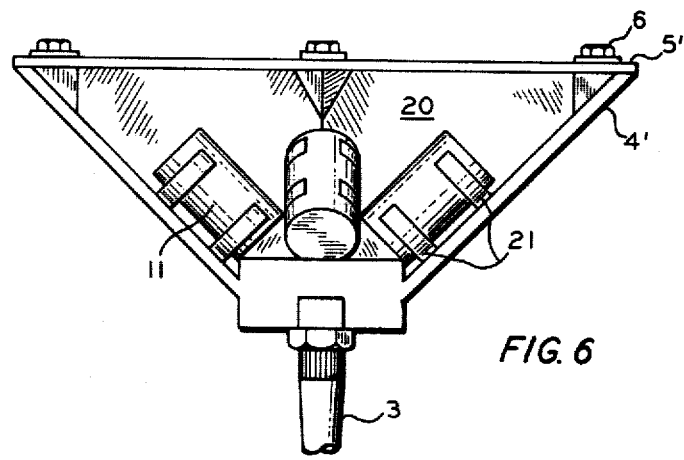
FIG. 6 is a view of another embodiment of the invention with a front portion of the housing removed.
Figure 7:
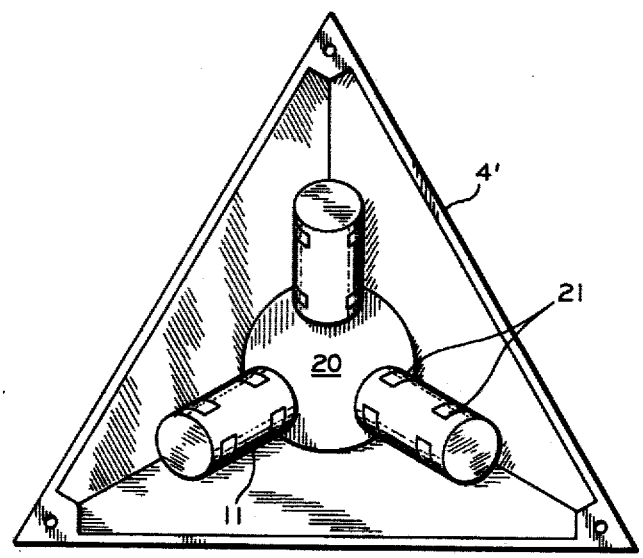
FIG. 7 is a plan view of FIG. 6, with the housing intact, but with the top housing cover removed.

The container portion 4 is adapted for receiving the geophones 11. As illustrated, each geophone 11 is mounted within the container portion 4 in one of the three geophone-receiving boreholes 12, with each bore 12 containing only one geophone 11. In an alternative construction as shown in FIGS. 6 and 7, the container portion 4 is hollowed out to form a single geophone receiving chamber 20, with geophones 11 suitably retained therein by mounting means such as clasps 21. Container portion 4' and cover 5' are modified from the embodiments shown in FIGS. 1 through 5. Geophones 11, support member 3, and screw 6 can be identical to the embodiments shown in FIGS. 1-5. Another alternative construction would be to encase the geophones 11 in thermoplastic, in which case the container portion 4 could be solid. Another alternative (not shown), is to mount the geophones in position exteriorly of the frame by suitable mounting means. It will be appreciated by those skilled in the art that the broad invention is the positioning of the geophones in the hereinafter-described manner by any suitable means. As illustrated in FIGS. 1-5, the bores 12 closely fit the geophones 11 and thus serve as mounting means to suitably position the geophones 11.

The geophones 11 are positioned in the bores 12 so that the principal axis of sensitivity of each geophone 11 intersects the hereinbefore-described plane at about an angle A. As used herein, the term "principal axis of sensitivity" is intended to describe the direction in which each geophone 11 is designed to detect motion. Although not to be limited thereto, the geophones 11 set forth herein by way of illustration have as their principal axis of sensitivity their longitudinal axes. When mounted in the housing portion 4, the principal axis of sensitivity of each geophone 11 coincides with the longitudinal axis of each bore 12. The angle A can be selected over a wide range. Generally, the angle A is between 5° and 85°, preferably between about 20° and 70°, most preferably, about 35° 16′, at which angle the principal axes of sensitivity of the geophones 11 can be arranged in mutually orthogonal directions. It is desirable, but not necessary, that the principal axis of sensitivity of each geophone be placed as close as possible to the selected angle A. Generally, the variance permissible is about 5°, less for small values of A due to the rapidity with which sine changes at small angles.

The bores 12 can be located and oriented within the body of the container portion 4 by a variety of means, for example they can be drilled or cast. The bores 12 and the principal axes of sensitivity of the geophones 11 are oriented so that their projections on the hereinbefore-described plane intersect. Expressed in another manner, none of the bores 12 or principal axes of sensitivity of geophones 11 are parallel. The essence of the invention is thus orienting the principal axis of sensitivity of each of three geophones at about the same angle from the direction in which gravity is acting on the geophones, with none of the principal axes of sensitivity of the geophones being parallel. This can be accomplished simply by affixing to the earth a support member having three geophones attached thereto, and orienting the support member with respect to the earth so that each geophone has its principal axis of sensitivity oriented at about an angle A with respect to the horizon. The projections of the bores 12 or principal axes of sensitivity on the hereinbefore-described plane are thus relatively unimportant, so long as they intersect. For best results, however, the angle separating any two principal axes of sensitivity is at least 60°. It is also preferable that the projections of the any two principal axes of sensitivity on the described plane intersect at about a 60° angle because the resulting symmetry simplifies calculations on the data obtained during use of the detector. The embodiment shown in FIG. 3 utilizes the 60° intersection of projected principal axes of sensitivity. In this embodiment, the principal axes of sensitivity of the geophones do not intersect. The embodiment shown in FIGS. 6 and 7 also utilizes the 60° intersection of the projections, but with the longitudinal axes of geophones 11 extending generally away from a common origin, along what can be described as the edges of a tetrahedral shape.

Figure 3:
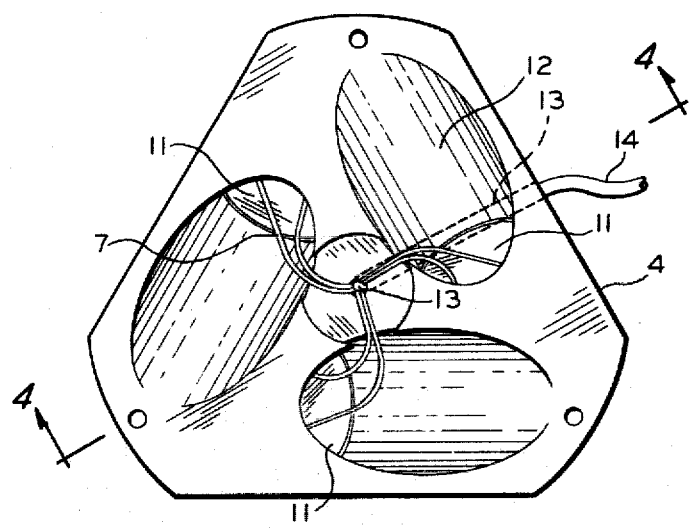
FIG. 3 is a plan view as in FIG. 2, but with the top covering of the seismic detector removed.
Figure 5:
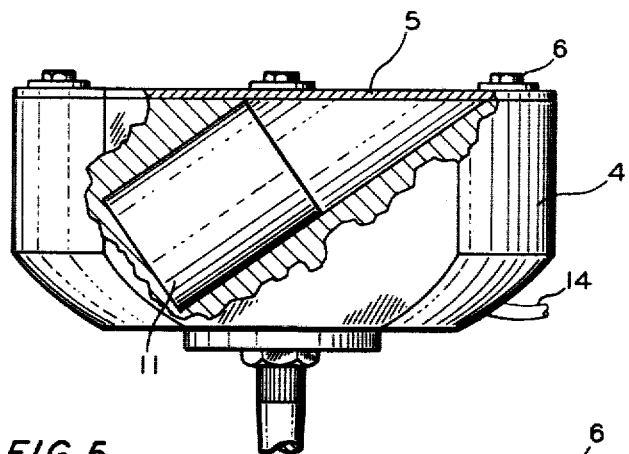
FIG. 5 is the seismic detector of FIG. 1 with a portion of the housing broken away to show the orientation of a geophone within.

The bores 12 as illustrated in FIG. 3 can also be described as tangential to a cylindrical shape extending through the housing 4 in a direction normal to the hereinbefore-described plane or parallel to the support member 3. Preferably, the bores 12 are drilled to the same depth, and the geophones 11 bottomed in the bores 12, and the bores 12 topped off with a sealing material so that the geophones 11 are completely encased. In this embodiment, the center points of the geophones 11 define a plane which is the same as or parallel to the hereinbefore-described plane which is normal to the support member 3.

It is desirable that each geophone 11 be located at about the same distance above ground level and at the same distance from the axis of the support member 3 as each of the other geophones 11 so that all three geophones are subjected to equal forces when vibrations are transmitted from the earth to the geophone 11 via the support member 3. The geophones 11 are located the same distance above the earth when placed in the parallel plane as above-described. By arranging the geophones in this plane so that each is at the same distance from the point at which the axis of the support member 3 intersects with the parallel plane, each geophone 11 will experience equal forces from vibrations transmitted via support member 3. Preferably, the geophones are at equal distance from each other and arranged as shown in FIG. 3, with the points at which their principal axes of sensitivity intersect with the first described plane also being at equal distances from each other and centered around the axial projection of the support member 3 on the first described plane.

A secondary passage 13 sufficiently large to allow the passage of an electrical terminal therethrough communicates between each of bores 12 and the exterior of the housing 2. When geophones 11 are present within the bores 12, electrical leads 7 from each of the geophones can be routed through the passage 13 to form a transmission line 14, for transmission of electrical signals produced by the transducers to a suitable receiving and recording device (not shown) as is known in the art.

The geophones 11 utilized in the invention are generally cylindrical in shape and designed to be operated at a constant inclination from the vertical. Such geophones are well known in the art and are commercially available from a number of manufacturers, such as, for example, Geospace, Inc., Houston, Tex.

In order to use the three-dimensional geophones to record three-dimensional data, it is necessary that a fixed orientation of the three-dimensional geophone be adopted as a standard field procedure. Once this standard orientation has been adopted, it is then possible to derive a transformation that will allow the field data to be transformed to vertical and horizontal signals for further analysis.

The case 1 should be aligned with the arrow 9 pointing away from the shot point. The case should be leveled with bubble level 8.

Figure 8:
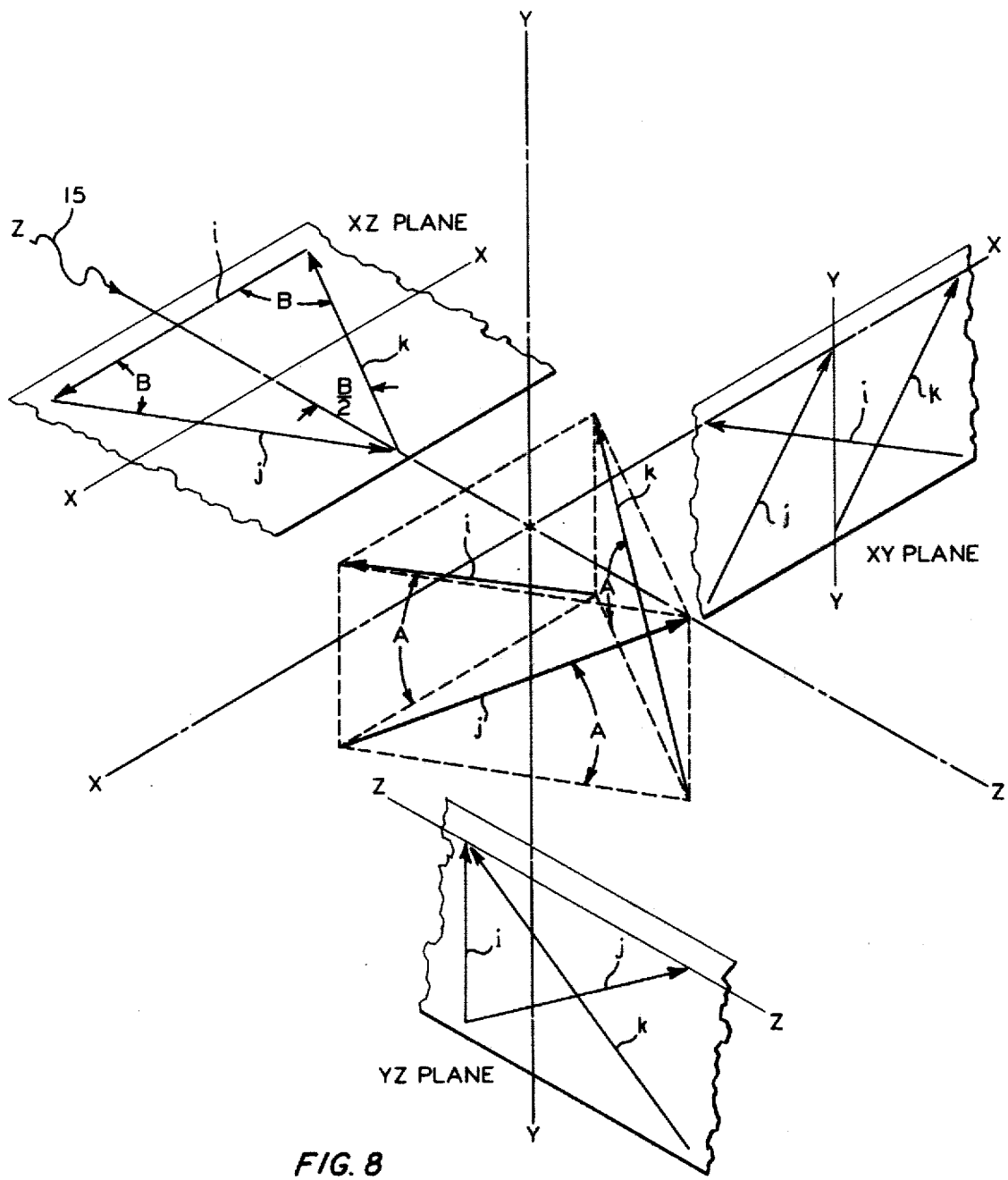
FIG. 8 is a diagram which represents the orientation of the geophones within one embodiment of a seismic detector of the present invention as vectors.

Referring now to FIG. 8, the shot point is assumed to be to the left of the cartesian coordinates shown, with seismic waves from the shot point propagating generally from left to right in the YZ plane, as shown by arrow 15.

The axes of principal sensitivity of the geophones 11 is assumed to be the longitudinal axes of bores 12. These axes are represented in FIG. 8 as vectors i, j and k, arranged around the origin of the depicted cartesian coordinates. The representation shown is further assumed to be that of the most preferred embodiment, with the longitudinal axes of the bores being at an angle A of 35° 16′ from the horizontal and lying in a staggered fashion along the diagonals of the rectangular sides of a pentahedral shape having 3 equal rectangular sides, as represented by the dashed lines. The projections, or shadows, of vectors i, j and k on the XY, YZ and XZ planes are also depicted in reduced size in FIG. 8.

Assume three independent vibrations arriving at the three-dimensional geophone to produce signals i, j and k. It is desired to transform these signals into a vertical signal and two horizontal signals. The vertical signals, $V_3$, represents the sum of the components of vectors i, j and k along the Y axis of the cartesian coordinates. Vectors i, j and k are inclined from the Y axis at an angle of 54.73° (0.9553 radians). The projection of each vector i, j and k is thus equal to the cosine of 54.73° (0.9553 radians), which is $1/\sqrt{3}$, times the magnitude of each vector. The transformed vertical component of vectors i, j and k is thus:

$$V_3(i,j,k) = 1/\sqrt{3}\ (i + j + k)$$

That component of signals i, j and k lying along the X axis of the cartesian coordinates is $H_1$. $H_1$ can be derived by first finding the components of vectors i, j and k lying in the XZ plane, and then finding the components of vectors i, j and k lying along the X axis from the components of vectors i, j and k so found in the XZ plane.

The component of vectors i, j and k lying in the XZ plane is equal to the magnitude of each vector times the sine of 54.73° (0.9553 radians). The sine of 54.73° (0.9553 radians) is $\sqrt{2}/\sqrt{3}$. The components of vectors i, j and k lying in the XZ plane are thus $(\sqrt{2}/\sqrt{3})$ i, $(\sqrt{2}/\sqrt{3})$ j and $(\sqrt{2}/\sqrt{3})$ k.

In the preferred embodiment of the invention, the agle B shown in the XZ plane of FIG. 8 is 60° (1.037 radians). The geophones are oriented so that the component of vector i lying in the XZ plane forms an angle of 0° (0 radians) with the X axis, the component of vector j lying in the XZ plane forms an angle of 60° (1.047 radians) with the X axis, and the component of vector k lying in the XZ plane forms an angle of 60° (1.047 radians) with the X axis.

The component of vector i which lies on the X axis is that component of vector i in the XZ plane times the cosine of the angle which the component makes with the X axis. The cosine of 0° (0 radians) is 1. This can be expressed as $$H_1(i) = \left(\sqrt{2}/\sqrt{3}\right) i\,(1)$$

The components of vectors j and k which lie on the X axis are those components of vectors j and k lying in the XZ plane times the cosine of the angle which each of those components make with the X axis. The cosine of 60° (1.047 radians) is ½. This can be expressed as $$H_1(j,k) = \left(\sqrt{2}/\sqrt{3}\right) j(\tfrac{1}{2}) + \left(\sqrt{2}/\sqrt{3}\right) k(\tfrac{1}{2})$$

Changing the sign of $H_1(j,k)$ to allow for a contribution in the opposite direction than $H_1(i)$, the sume of the components of vectors i, j and k along the X axis can be expressed as $$H_1(i,j,k) = \left(\sqrt{2}/\sqrt{3}\right) (i) - \left(1/\sqrt{6}\right) (j + k)$$

That component of signals i, j and k lying normal to the wave front and along the Z axis is $H_2$. $H_2$ can be derived similar to $H_1$, by first finding the component of vectors i, j and k lying in the XZ plane and then finding the component of the first component which lies along the Z axis. As previously shown, the components of vectors i, j and k lying in the XZ plane are $(\sqrt{2}/\sqrt{3})$ i, $(\sqrt{2}/\sqrt{3})$ j, and $(\sqrt{2}/\sqrt{3})$ k. The component which lies along the Z axis is equal to the components of vectors i, j and k which lie in the XZ plane times the cosine of the angle which each component makes with the Z axis. Vector i forms an angle of 90° (1.5707 radians) with the Z axis. Vecors j and k form an angle of 30° (0.5235 radians) with the Z axis. The cosine of 90° (1.5707 radians) is 0, the cosine of 30° (0.5235 radians) is $\sqrt{3}/2$. Because the cosine of 90° (1.5707 radians) is 0, vector i makes no contribution. Vectors j and k contribute in opposite directions, so the net result of the two, expressed as a difference and simplified is:

$$H_2 = \left(1/\sqrt{2}\right) (j - k)$$

Seismic digital field processors, such as are known in the art, can be programmed by those skilled in the art from the teachings of the above equations to produce useful information from the signals received from the three-dimensional geophone of the present invention.

It is to be understood that while there has been illustrated and described certain forms of this invention, it is not to be limited to the specific form or arrangements of parts herein described and shown, except to the extent that such limitations are found in the claims.

What is claimed is:

1. A geophone holder comprising a frame having a geophone holding portion and a support portion, the geophone holding portion adapted to hold three geophones so that the principal axis of sensitivity of each geophone forms an angle of about A with a first plane crossing through a portion of said frame, the geophone holding portion further adapted to hold three geophones so that the projection of the principal axis of sensitivity of any one geophone on said first plane intersects with the projections of the principal axes of sensitivity of the other two geophones, the support portion of said frame extending in a direction generally normal to said first plane.

2. A geophone holder as in claim 1 wherein said angle A is between 5° and 85°.

3. A geophone holder as in claim 2 wherein said angle A is between 20° and 70°.

4. A geophone holder as in claim 3 wherein said angle A is about 35° 16′.

5. A geophone holder as in claim 2 wherein the geophone holding portion is adapted to encase three geophones in fixed positions.

6. A geophone holder as in claim 3 wherein the geophone holding portion is further adapted to hold three geophones in a second plane which is parallel to the first plane.

7. A geophone holder as in claim 6 wherein the geophone holding portion is further adapted to hold three geophones at a fixed distance from a point on said second plane.

8. A geophone holder as in claim 7 wherein the geophone holding portion is further adapted to hold three geophones at an equal distance from each other.

9. A geophone holder as in claim 8 wherein the geophone holding portion is further adapted to hold three geophones so that the point at which the principal axes of sensitivity of each geophone intersect with said first plane is at a fixed distance from a point on said first plane.

10. A seismic detector comprising a frame having a support portion and three geophones affixed to said frame so that the principal axis of sensitivity of each geophone forms an angle of about A with a first plane crossing through a portion of said frame and the projection of the principal axis of sensitivity of any one geophone on said first plane intersects with the projections of the principal axis of sensitivity of the other two geophones, the support portion of said frame extending in a direction generally normal to said first plane.

11. A seismic detector as in claim 10 wherein said angle A is between 5° and 85°.

12. A seismic detector as in claim 11 wherein said angle A is between 20° and 70°.

13. A seismic detector as in claim 12 wherein said angle A is about 35° 16′.

14. A seismic detector as in claim 11 wherein said frame encases the three geophones.

15. A seismic detector as in claim 12 wherein at least a portion of each of said three geophones lies in a second plane which is parallel to said first plane.

16. A seismic detector as in claim 15 wherein each of said three geophones is located at a fixed distance from a point on said second plane.

17. A seismic detector as in claim 16 wherein the three geophones are located at a fixed distance from each other.

18. A seismic detector as in claim 16 wherein the principal axis of sensitivity of each geophone intersects with said first plane at a fixed distance from a point on said first plane.

19. A method for constructing a geophone housing comprising: placing three boreholes in a body, each borehole being inclined at about an angle A from a plane passing through said body with none of said boreholes being parallel and fastening a support member to said body, said support member extending from said body in a direction generally normally to said plane.

20. A method as in claim 19 wherein said angle A is between 5° and 85°.

21. A method as in claim 20 wherein said angle A is between about 20° and 70°.

22. A method as in claim 21 whrein said angle A is about 35° 16′.

23. A method as in claim 21 wherein said boreholes are drilled.

24. A method as in claim 21 wherein said boreholes are cast.

25. A method as in claim 21 wherein said body is a thermoplastic material.

26. A method as in claim 21 wherein said boreholes are oriented tangentially around a cylindrical shape passing through said body normal to said plane.

27. A method as in claim 26 wherein an upper portion of each borehole is adjacent a lower portion of an adjacent borehole.

28. A method as in claim 27 wherein the projections of the boreholes on the plane passing through the body form an equilateral triangle.

29. A method for constructing a seismic detector comprising affixing three geophones to a frame having a support portion extending in a direction generally normal to a first plane crossing through a portion of said frame, said geophones being affixed to said frame so that the principal axis of sensitivity of each geophone forms an angle of about A with said first plane and the projection of the principal axis of sensitivity of any one geophone on said first plane intersects with the projections of the principal axes of sensitivity of the other two geophones.

30. A method as in claim 29 wherein said angle A is between 5° and 85°.

31. A method as in claim 30 wherein said angle A is between 20° and 70°.

32. A method as in claim 31 wherein said angle A is about 35° 16′.

33. A method as in claim 31 wherein said frame encases said geophones.

34. A method as in claim 33 wherein said frame comprises a thermoplastic material.

35. A method as in claim 33 wherein said geophones are affixed to said frame so that said geophones lie in a second plane which is parallel to said first plane.

36. A method as in claim 35 wherein said geophones are located at a fixed distance from a point on said second plane.

37. A method as in claim 36 wherein said geophones are located at a fixed distance from each other.

38. A method as in claim 37 wherein said geophones are oriented so that the point at which the principal axis of sensitivity of each geophone intersects with said first plane is at a fixed distance from a point on said first plane.

39. A method of orienting three geophones with respect to the earth to detect particle motion waves comprising affixing to the earth a support member having three geophones attached thereto and orienting the support member so that each geophone has its principal axis of sensitivity oriented at about an angle A of between 5° and 85° with respect to the horizon.

40. A method as in claim 39 wherein the angle A is between about 20° and 70°.

41. A method as in claim 40 wherein the angle A is about 35° 16′.

42. A method as in claim 40 wherein an angle of at least 60° separates the principal axis of sensitivity of any two geophones.

* * * * *